United States Patent
Nishimura et al.

(10) Patent No.: US 8,989,980 B2
(45) Date of Patent: Mar. 24, 2015

(54) BRAKE DEVICE AND SADDLE RIDING TYPE VEHICLE

(71) Applicant: Yamaha Hatsudoki Kabushiki Kaisha, Iwata-shi, Shizuoka (JP)

(72) Inventors: Masaya Nishimura, Shizuoka (JP); Takaaki Mizutani, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/375,191

(22) PCT Filed: Jan. 25, 2013

(86) PCT No.: PCT/JP2013/051559
§ 371 (c)(1),
(2) Date: Jul. 29, 2014

(87) PCT Pub. No.: WO2013/115089
PCT Pub. Date: Aug. 8, 2013

(65) Prior Publication Data
US 2015/0057904 A1 Feb. 26, 2015

(30) Foreign Application Priority Data
Jan. 31, 2012 (JP) ................................ 2012-018939

(51) Int. Cl.
*G06F 19/00* (2011.01)
*B60T 13/00* (2006.01)
(Continued)

(52) U.S. Cl.
CPC . *B62L 3/08* (2013.01); *B60T 8/241* (2013.01); *B60T 8/17551* (2013.01); *B60T 8/17554* (2013.01)
USPC .......................................... 701/70; 303/9.64

(58) Field of Classification Search
CPC ... B60T 11/101; B60T 8/1706; B60T 8/1766; B60T 8/261; B60T 8/3225; B60T 11/16; B60T 13/12; B62L 3/08; F15B 15/02

USPC .............. 701/70; 303/9.64, 137, 3, 9.6, 15; 340/440
See application file for complete search history.

(56) References Cited

U.S. PATENT DOCUMENTS

| 5,372,408 A | 12/1994 | Tsuchida et al. |
| 5,445,443 A | 8/1995 | Hauser et al. |

(Continued)

FOREIGN PATENT DOCUMENTS

| JP | 03-057755 A | 3/1991 |
| JP | 07-002077 A | 1/1995 |

(Continued)

OTHER PUBLICATIONS

Official Communication issued in International Patent Application No. PCT/JP2013/051559, mailed on Mar. 26, 2013.

*Primary Examiner* — Muhammad Shafi
(74) *Attorney, Agent, or Firm* — Keating & Bennett, LLP

(57) ABSTRACT

A lean angle detection sensor detects a lean angle of a vehicle. A storage portion stores a second relationship that represents a ratio of a braking force of a front wheel brake to a target braking force for each lean angle and/or a third relationship that represents a relationship with a ratio of the braking force of a rear wheel brake to a target braking force for each lean angle. A ratio setter determines which second relationship to refer to among the second relationships stored in the storage portion based on a detection result input to a detection result input portion and/or determines which third relationship to refer to among the third relationships stored in the storage portion based on a detection result input to a detection result input portion. The ratio setter sets a ratio of the braking force of the front wheel brake and the braking force of the rear wheel brake based on the second relationship and/or the third relationship.

8 Claims, 11 Drawing Sheets

(51) Int. Cl.
  *B62L 3/08* (2006.01)
  *B60T 8/24* (2006.01)
  *B60T 8/1755* (2006.01)

(56) References Cited

U.S. PATENT DOCUMENTS

| | | |
|---|---|---|
| 6,409,285 B1 | 6/2002 | Wakabayashi et al. |
| 7,219,965 B2 | 5/2007 | Wagner |
| 2003/0132837 A1* | 7/2003 | Hasegawa et al. ............ 340/440 |
| 2004/0098185 A1* | 5/2004 | Wang ............................ 701/70 |
| 2005/0146207 A1* | 7/2005 | Wagner ........................ 303/9.64 |

FOREIGN PATENT DOCUMENTS

| | | |
|---|---|---|
| JP | 3329851 B2 | 9/2002 |
| JP | 2005-535513 A | 11/2005 |
| JP | 2010-012903 A | 1/2010 |
| JP | 4526135 B2 | 8/2010 |
| JP | 2011-507744 A | 3/2011 |

* cited by examiner

BRAKE DEVICE AND SADDLE RIDING TYPE VEHICLE

BACKGROUND OF THE INVENTION

1. Field of the Invention

The present invention relates to a brake device and a saddle riding type vehicle, and more specifically to a brake device in which a front wheel brake and a rear wheel brake are activated in association with each other by one brake operator, and a saddle riding type vehicle including the brake device.

2. Description of the Related Art

A motorcycle is known as a kind of saddle riding type vehicle. The motorcycle is provided with brakes to brake the rotation of a front wheel and a rear wheel. Motorcycles with an interlocking brake device have already been put to practical use. The interlocking brake device allows brakes for front and rear wheels of a motorcycle to be operated by one lever.

In an interlocking brake device disclosed in Japanese Patent No. 4526135, a braking force distribution characteristic curve is changed based on traveling information such as vehicle speed and wheel slipping states. The braking force of the front wheel brake and the braking force of the rear wheel brake are controlled based on the braking force distribution characteristic curve.

The interlocking brake device disclosed in Japanese Patent No. 3329851 allows a rider to adjust the ratio of the braking force of the front wheel brake and the braking force of the rear wheel brake as the rider desires among ideal braking force distribution characteristic curves for riding single and riding double.

In the brake device disclosed in JP-A 2005-535513, the ratio of the braking force of the front wheel brake and the braking force of the rear wheel brake is changed depending on a reduction ratio to a ratio based on an ideal braking force distribution characteristic curve or a predetermined ratio in order to maintain safety and operation comfort.

The above-described prior art documents disclose how to set a ratio of the braking force of the front wheel brake and the braking force of the rear wheel brake by changing the braking force distribution characteristic curve depending on slipping states, vehicle speed, and the like and how a rider can adjust the ratio of the braking force of the front wheel brake and the braking force of the rear wheel brake.

FIG. 11 shows a state of motorcycle leaning at a lean angle $\theta$. A motorcycle sometimes turns as its vehicle body is leaning as shown in FIG. 11. When the motorcycle turns while its vehicle body is leaning and the front wheel brake acts hard, a phenomenon occurs in which the vehicle body rises. More specifically, the lean angle $\theta$ is reduced. It is therefore difficult for the motorcycle to turn while its vehicle body is leaning and the brake device is activated. However, it is generally easier for the motorcycle to turn when the vehicle body is leaning and the speed is lower.

SUMMARY OF THE INVENTION

Preferred embodiments of the present invention provide a structure that allows a vehicle body to be maintained in a leaning attitude when the vehicle is turning and the vehicle body is leaning and the brakes are activated.

A brake device according to a preferred embodiment of the present invention is a brake device provided in a saddle riding type vehicle and includes a front wheel brake, a rear wheel brake, a brake operation unit, a lean angle detection sensor, a detection result input portion, a storage portion, a target braking force setter, a ratio setter, and a braking force calculator. The front wheel brake causes a braking force to act on the front wheel. The rear wheel brake causes a braking force to act on the rear wheel. The brake operation unit operates the front wheel brake and the rear wheel brake using one operator. The lean angle detection sensor detects a lean angle of the vehicle body of the saddle riding type vehicle. The detection result input portion is provided with a detection result from the lean angle detection sensor as an input. The storage portion stores a first relationship that represents a relationship between an operation amount of the brake operation unit and target braking force. The storage portion stores a second relationship that represents a ratio of the braking force of the front wheel brake to the target braking force determined for each lean angle and/or a third relationship that represents a ratio of the braking force of the rear wheel brake to the target braking force determined for each lean angle. The target braking force setter sets a target braking force based on an operation amount of the braking operation unit by referring to the first relationship. The ratio setter determines which second relationship to refer to among the second relationships stored in the storage portion from the detection result input to the detection result input portion and/or determines which third relationship to refer to among the third relationships stored in the storage portion from the detection result input to the detection result input portion. The ratio setter sets a ratio of the braking force of the front wheel brake and the braking force of the rear wheel brake based on the second relationship and/or the third relationship. The braking force calculator is configured and programmed to calculate a braking force for the front wheel brake and a braking force for the rear wheel brake based on the target braking force set by the target braking force setter and the ratio set by the ratio setter.

The ratio of the braking force of the front wheel brake and the braking force of the rear wheel brake are controlled depending on the lean angle of the vehicle body. Therefore, if the lean angle of the vehicle body is large, the ratio of the braking force of the front wheel brake is controlled to be reduced. Even if the brakes are activated as the vehicle body is leaning, the reduction in the braking force of the front wheel brake allows the vehicle to turn as the vehicle body is maintained in the leaning state, which makes the motorcycle turn more easily.

When the brakes are activated while the vehicle body is leaning, the lean angle of the vehicle body is reduced or the vehicle body is raised depending on the ratio of the braking force of the front wheel brake and the braking force of the rear wheel brake. The vehicle is thus turned in an attitude as desired by a rider.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
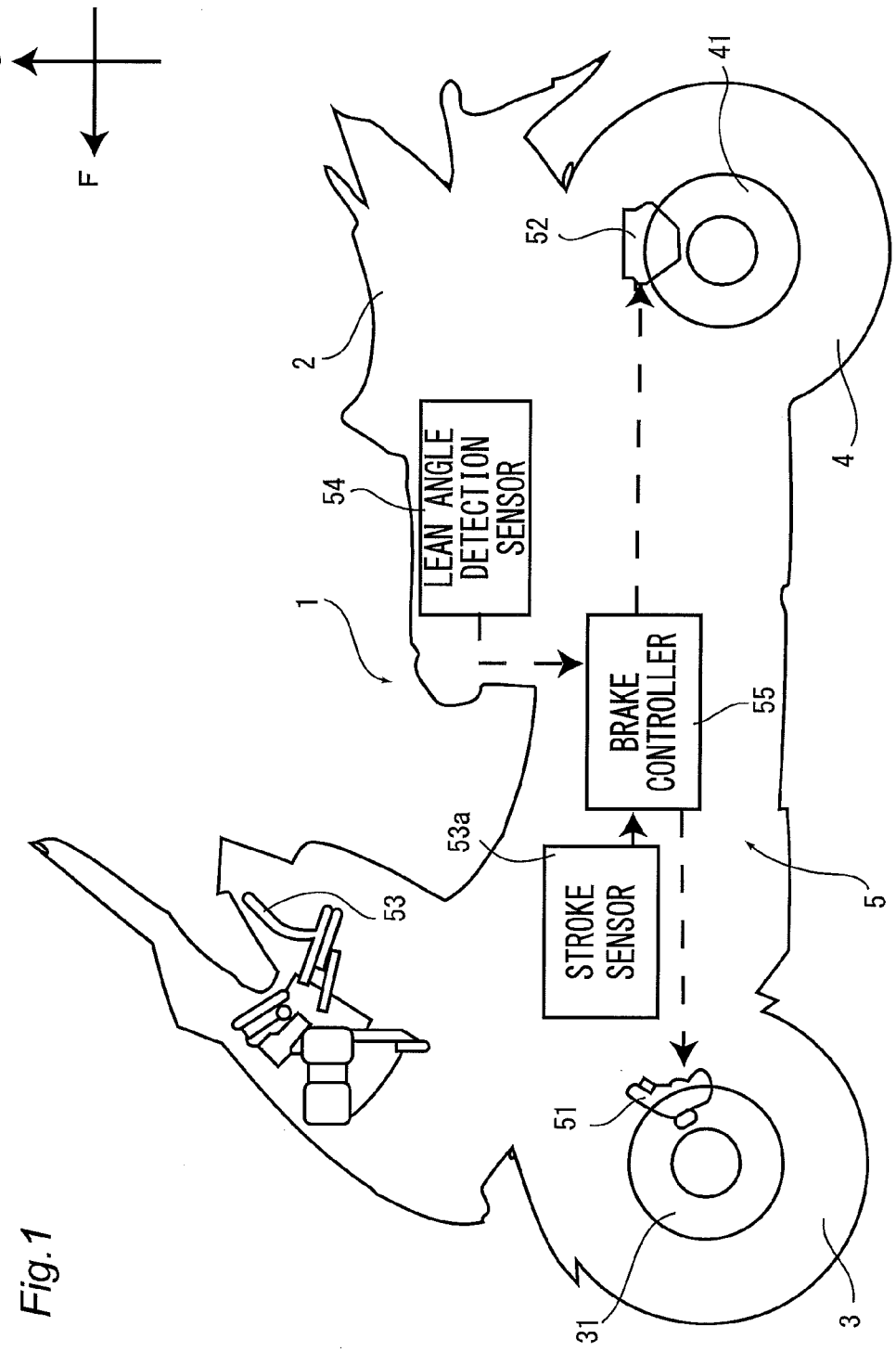
FIG. 1 is a schematic general view of a motorcycle including a brake device according to a preferred embodiment of the present invention.

Now, a motorcycle 1 including a brake device 5 according to a first preferred embodiment of the present invention will be described in conjunction with the accompanying drawings. In the drawings, the same or corresponding portions are designated by the same reference characters and their description will not be repeated.

FIG. 1 is a schematic general view of the motorcycle 1 including the brake device 5 according to the first preferred embodiment of the present invention. In the following description, the front, back, left, and right refer to these directions as viewed from a rider seated on a seat of the motorcycle 1. The arrow F in FIG. 1 indicates a forward direction of the motorcycle 1 and the arrow U indicates an upward direction of the motorcycle 1.

The motorcycle 1 includes a vehicle main body 2, a front wheel 3, a rear wheel 4, and the brake device 5.

The vehicle main body 2 includes a vehicle body frame, a vehicle body cover, a head light, the seat, and the like.

The front wheel 3 is provided at a front portion of the vehicle main body 2 in a steerable manner through a front fork (not shown). The front wheel 3 is connected to the brake device 5. The front wheel 3 is provided with a front disk plate 31. The front disk plate 31 is preferably an annular member. The front disk plate 31 is provided at a side of the front wheel 3.

The rear wheel 4 is provided at a rear portion of the vehicle main body 2 through a rear arm (not shown). The rear wheel 4 is connected to the brake device 5. The rear wheel 4 is provided at the rear portion of the vehicle main body 2. The rear wheel 4 is provided with a rear disk plate 41. The rear disk plate 41 is provided at a side of the rear wheel 4. The rear disk plate 41 is preferably an annular member.

The brake device 5 includes a front wheel brake 51, a rear wheel brake 52, a brake lever 53, a lean angle detection sensor 54, a stroke sensor 53a, and a brake controller 55.

The front wheel brake 51 is attached to the front fork that supports the front wheel 3. The front wheel brake 51 is a device configured to apply braking on the rotation of the front wheel 3.

The rear wheel brake 52 is attached to the rear arm that supports the rear wheel 4. The rear wheel brake 52 is a device configured to apply braking on the rotation of the rear wheel 4.

The brake lever 53 operates the front wheel brake 51 and the rear wheel brake 52. The pair of the brake levers 53 are attached to the left and right handles. FIG. 1 shows only the brake lever 53 attached to the left handle. When the brake lever 53 attached to the right handle is operated, only the front wheel brake 51 is activated. The brake lever 53 attached to the left handle activates the front wheel brake 51 and the rear wheel brake 52 in association with each other.

The lean angle detection sensor 54 is a sensor configured to detect the lean angle of the vehicle body. The lean angle detection sensor 54 preferably includes a gyro sensor, for example. The lean angle detection sensor 54 detects a lean angle of the vehicle body based on an angular speed of the vehicle body of the motorcycle detected by the gyro sensor.

The stroke sensor 53a detects an amount of how much the brake lever 53 is operated.

The brake controller 55 is a device configured and programmed to control the front wheel brake 51 and the rear wheel brake 52. The brake controller 55 is connected to the stroke sensor 53a, the lean angle detection sensor 54, the front wheel brake 51, and the rear wheel brake 52.

Figure 2:
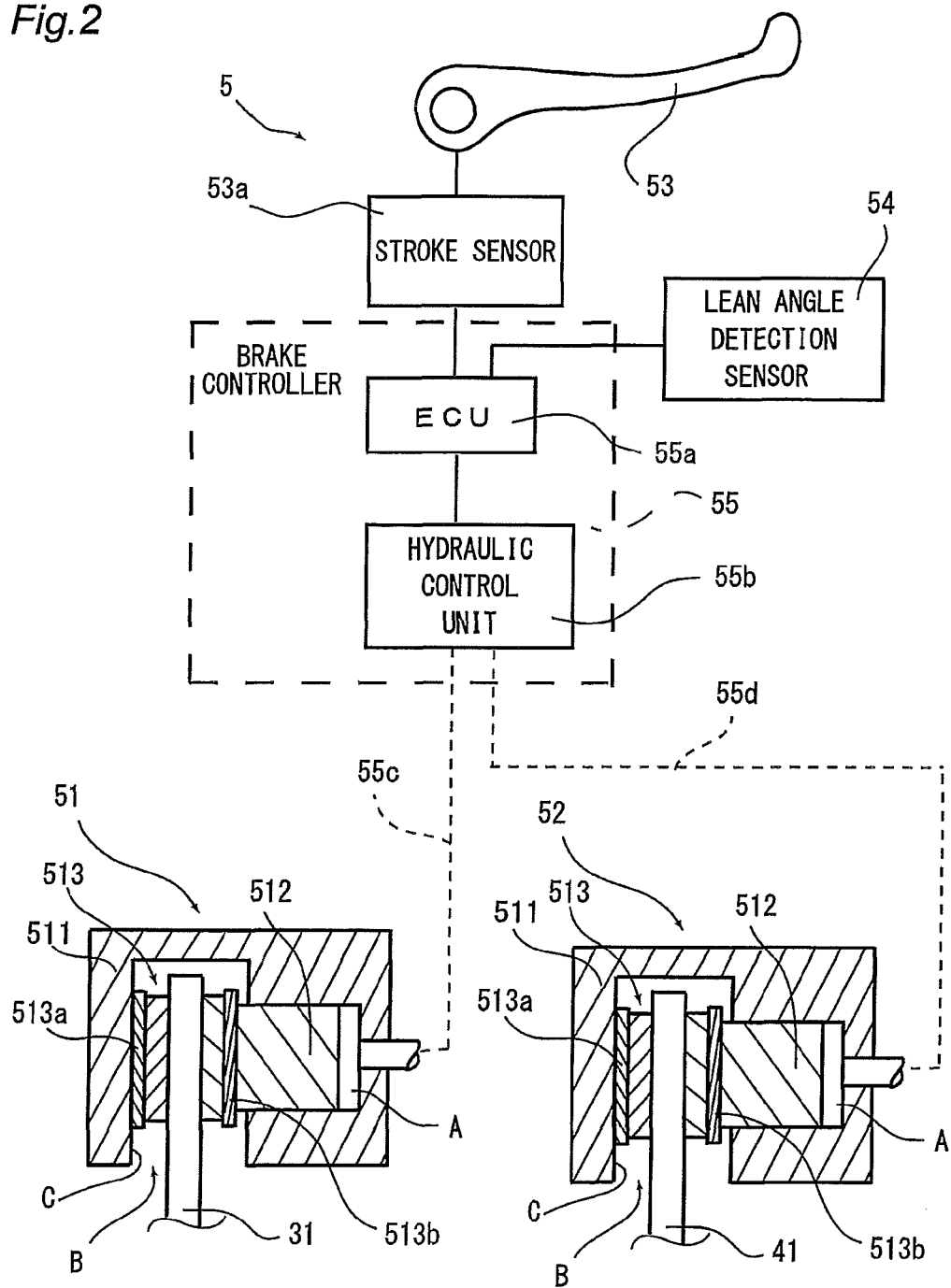
FIG. 2 is a schematic view of a structure of the brake device.

FIG. 2 is a schematic general view of the brake lever 53, the lean angle detection sensor 54, the brake controller 55, the front wheel brake 51, and the rear wheel brake 52.

The brake lever 53 is a portion configured to be operated by a rider when the rider brakes the motorcycle 1. The brake lever 53 is attached to the stroke sensor 53a.

The brake controller 55 is configured and programmed to determine the braking force on the front wheel 3 by the front wheel brake 51 and the braking force on the rear wheel 4 by the rear wheel brake 52. The brake controller 55 includes an ECU (electronic control unit) 55a and a hydraulic control unit 55b.

The ECU 55a is connected to the stroke sensor 53a and the lean angle detection sensor 54. The ECU 55a receives signals related to detection results from the stroke sensor 53a and the lean angle detection sensor 54. The ECU 55a is configured and programmed to calculate the braking force for the front wheel brake 51 and the braking force for the rear wheel brake 52 based on the operation amount by the brake lever 53 and the lean angle of the vehicle body. The ECU 55a is configured and programmed to control the hydraulic control unit 55b based on the calculation results.

The hydraulic control unit 55b receives a signal from the ECU 55a to activate the front wheel brake 51 and the rear wheel brake 52. The hydraulic control unit 55b is connected to the front wheel brake 51 through a front brake hydraulic pipe 55c. The hydraulic control unit 55b is connected to the rear wheel brake 52 through a rear brake hydraulic pipe 55d.

The front wheel brake 51 is a device configured to apply braking on the rotation of the front disk plate 31. The front wheel brake 51 includes a caliper body 511, a brake piston 512, and a pair of brake pads 513.

The caliper body 511 is connected to one end of the front brake hydraulic pipe 55c. The caliper body 511 includes a space A in which the brake piston 512 is stored. The space A is connected to the front brake hydraulic pipe 55c. Brake oil comes into the space A from the front brake hydraulic pipe 55c. The caliper body 511 includes a groove B at which a portion of the front disk plate 31 is disposed. The caliper body 511 supports the brake pads 513 at its side wall C that defines the groove B.

The brake piston 512 is in contact with one of the brake pads 513. Brake oil is supplied into the space A through the front brake hydraulic pipe 55c, and the brake piston 512 presses the brake pad 513 toward the front disk plate 31.

The pair of the brake pads 513 include a first brake pad 513a and a second brake pad 513b. The first and second brake pads 513a and 513b are arranged with the front disk plate 31 interposed between them. The first brake pad 513a is located between the front disk plate 31 and the side wall C of the caliper body 511. The second brake pad 513b is located between the brake piston 512 and the front disk plate 31.

The rear wheel brake 52 is a device configured to apply braking on the rotation of the rear disk plate 41. The rear wheel brake 52 preferably has the same structure as the front wheel brake 51 and therefore further description will not be provided. The same elements as those of the front wheel brake 51 are designated by the same reference characters.

Figure 3:
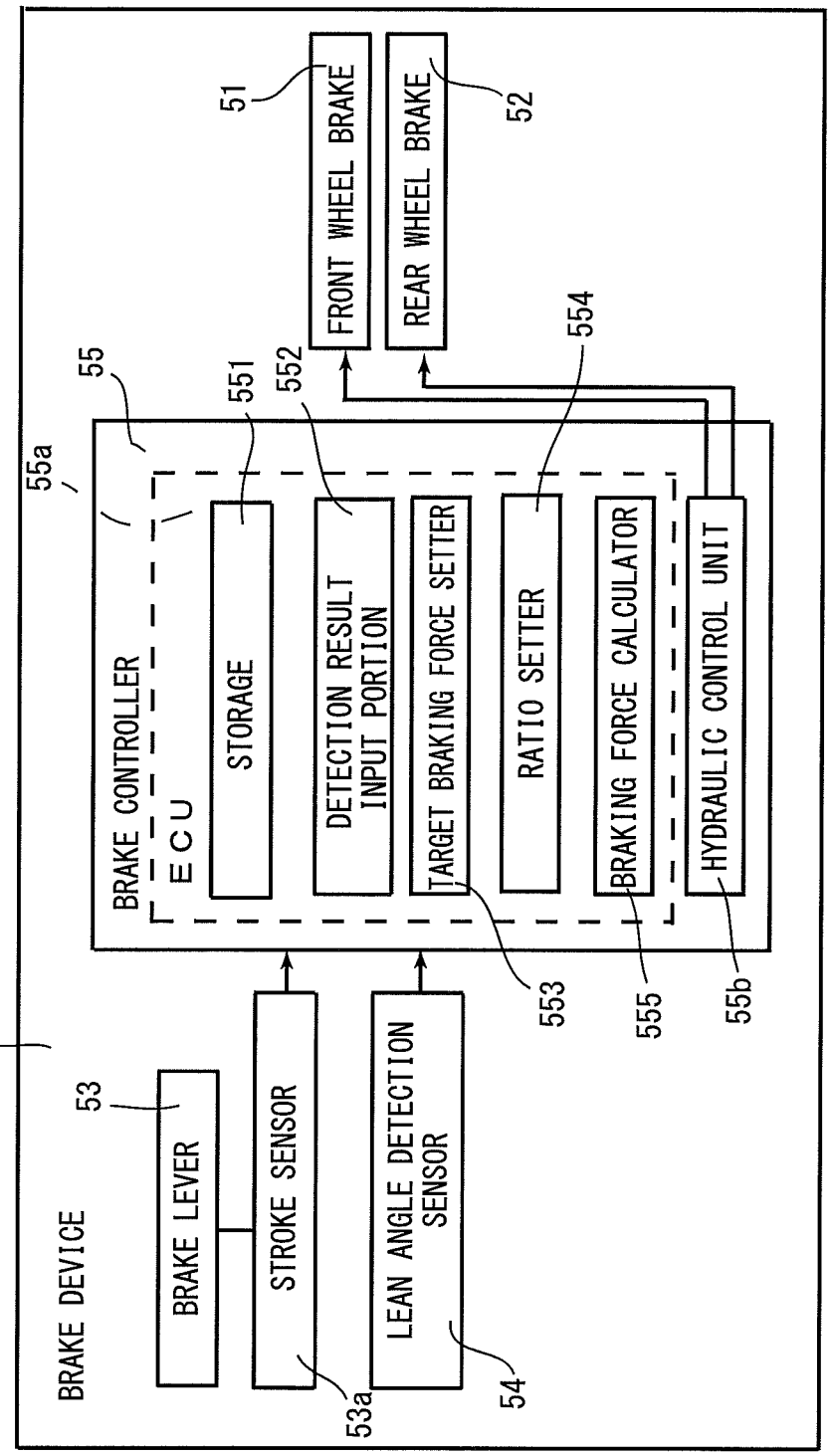
FIG. 3 is a general block diagram of the brake device.

FIG. 3 is a block diagram of a structure of the brake device 5. Referring to FIG. 3, the structure of the brake device 5 will be described.

The brake device 5 includes the front wheel brake 51, the rear wheel brake 52, the brake lever 53, the lean angle detection sensor 54, the stroke sensor 53a, and the brake controller 55.

The brake controller 55 is a device configured and programmed to control the front wheel brake 51 and the rear wheel brake 52 as described above and includes the ECU 55a and the hydraulic control unit 55b. The ECU 55a includes a storage portion 551, a detection result input portion 552, a target braking force setter 553, a ratio setter 554, and a braking force calculator 555.

The storage portion 551 stores data about the first, second, and third relationships. Here, the first relationship is a relationship between an operation amount of the brake lever 53 and target braking force. The second relationship is a relationship that represents a ratio of the target braking force and the braking force of the front wheel brake 51. The third relationship is a relationship that represents a ratio of the target braking force and the braking force of the rear wheel brake 52.

The detection result input portion 552 is provided with a result of detection by the lean angle detection sensor 54 as an input.

The target braking force setter 553 sets the target braking force based on a detection result from the stroke sensor 53a. The target braking force refers to a braking force depending on the operation amount of the brake lever 53.

The ratio setter 554 is configured to set a ratio of the braking force of the front wheel brake 51 and the braking force of the rear wheel brake 52. The ratio setter 554 is configured to determine which second and third relationships, described in more detail below, to refer to based on the lean angle of the vehicle body. The ratio setter 554 sets a ratio of the braking force of the front wheel brake 51 and the braking force of the rear wheel brake 52 based on the second and third relationships.

The braking force calculator 555 is configured and programmed to calculate the braking force for the front wheel brake 51 based on a ratio of the target braking force and the braking force of the front wheel brake 51. The braking force calculator 555 also calculates the braking force for the rear wheel brake 52 based on a ratio of the target braking force and the braking force of the rear wheel brake 52.

Figure 4:
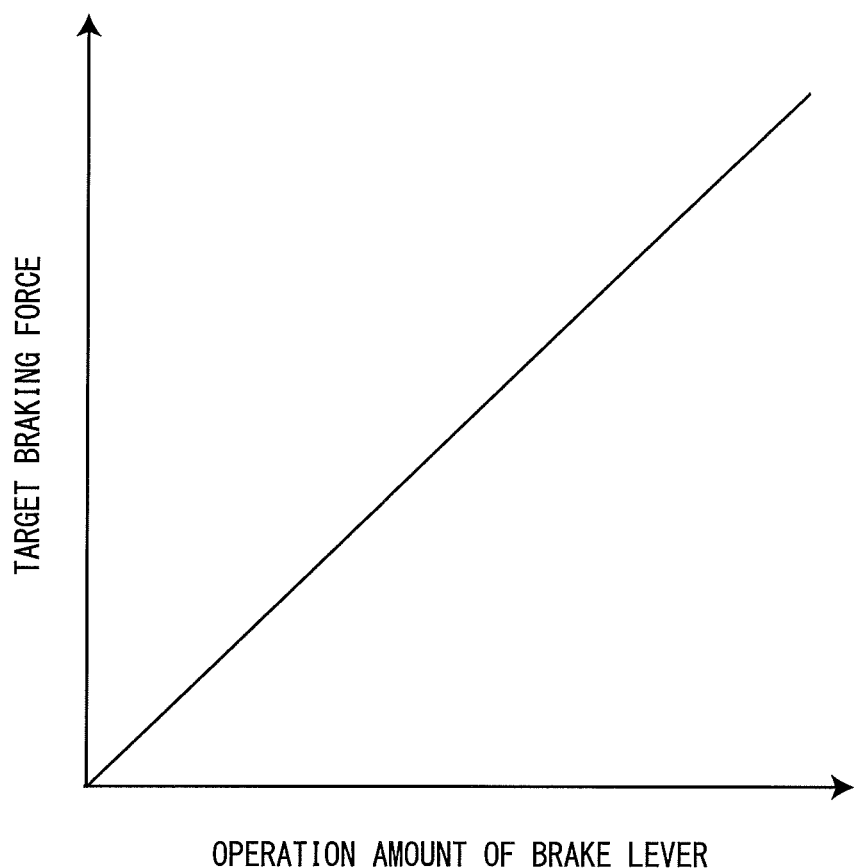
FIG. 4 is a graph showing a relationship between target braking force and the operation amount of a brake lever.

FIG. 4 shows the first relationship.

As shown in FIG. 4, the operation amount of the brake lever 53 and the target braking force is represented by the following Expression (1).

$$\text{Target braking force} = (\text{operation amount of braking lever}) * A \quad (1)$$

"A" in the above Expression (1) is a prescribed constant.

When the brake lever 53 is operated, the operation amount of the brake lever 53 is detected by the stroke sensor 53a. When the operation amount of the brake lever 53 is detected by the stroke sensor 53a, the target braking force setter 553 is configured and programmed to calculate the target braking force from the operation amount of the brake lever 53 by referring to the first relationship.

Here, a relationship represented by the following Expression (2) is established between the target braking force and the braking force of the front wheel brake 51 and the braking force of the rear wheel brake 52.

$$\text{Target braking force} = (\text{braking force of front wheel brake}) + (\text{braking force of rear wheel brake}) \quad (2)$$

Figure 5:
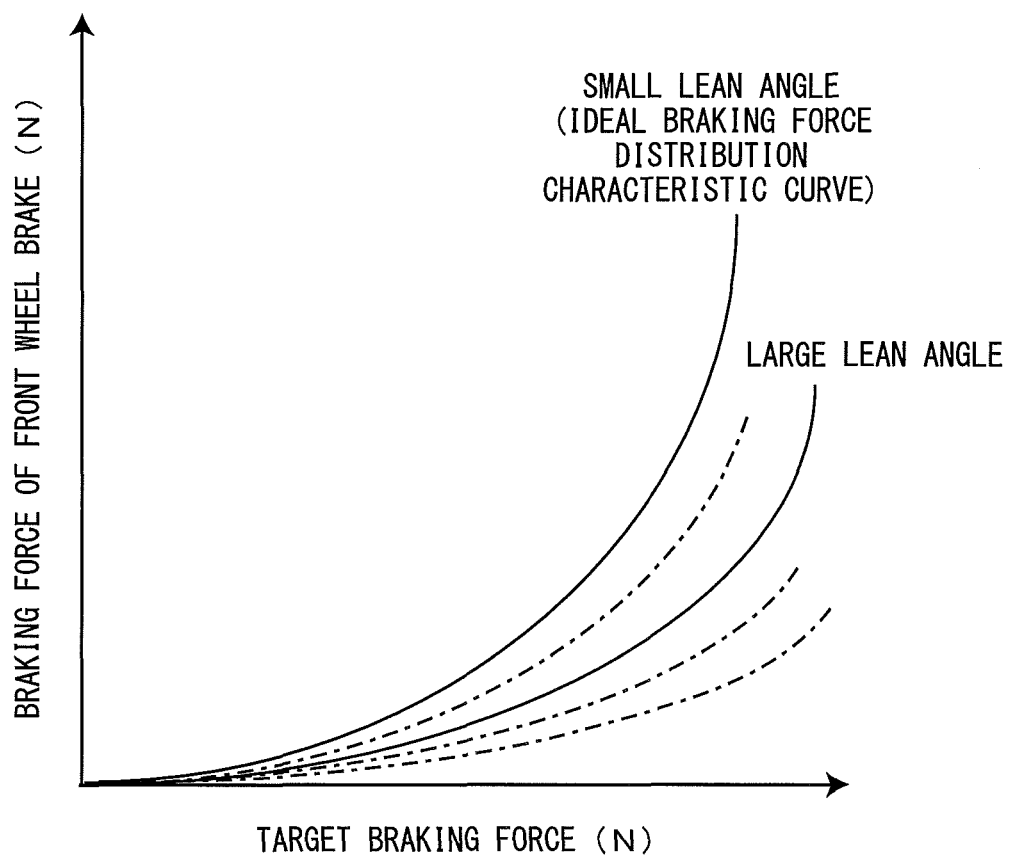
FIG. 5 is a graph showing a ratio relationship between target braking force and the braking force of a front wheel.

FIG. 5 shows the second relationships. Note that FIG. 5 shows by the solid lines only one example of the second relationship each for a small lean angle (ideal braking force distribution characteristic curve) and a large lean angle. The ideal braking force distribution characteristic curve relates to a ratio of the braking force of the front wheel brake 51 and the braking force of the rear wheel brake 52 when the front wheel 3 and the rear wheel 4 stop rotating at the same time (in a wheel-locked state) as the lean angle of the vehicle body is small. The ideal braking force distribution characteristic curve in FIG. 5 represents a relationship between the braking force of the front wheel brake 51 and target braking force, while the relationship according to the above Expression (2) is established between the braking force of the front wheel brake 51 and the braking force of the rear wheel brake 52 and therefore a ratio of the braking force of the front wheel brake 51 and the braking force of the rear wheel brake 52 is calculated from the relationship shown in FIG. 5 and Expression (2). As indicated by the chain lines as examples in FIG. 5, a plurality of different second relationships are stored on a lean angle basis for large lean angles. Although FIG. 5 shows the plurality of second relationships by the solid lines and the chain line, the second relationships in FIG. 5 are examples only, and the storage portion 551 actually stores even more different second relationships on a lean angle basis.

In FIG. 5, the solid lines indicate two second relationships corresponding to the lean angles of the motorcycle 1. The ratio of the braking force of the front wheel brake 51 to the total target braking force is smaller when the lean angle of the motorcycle 1 is large as compared to when the lean angle of the motorcycle 1 is small.

Figure 6:
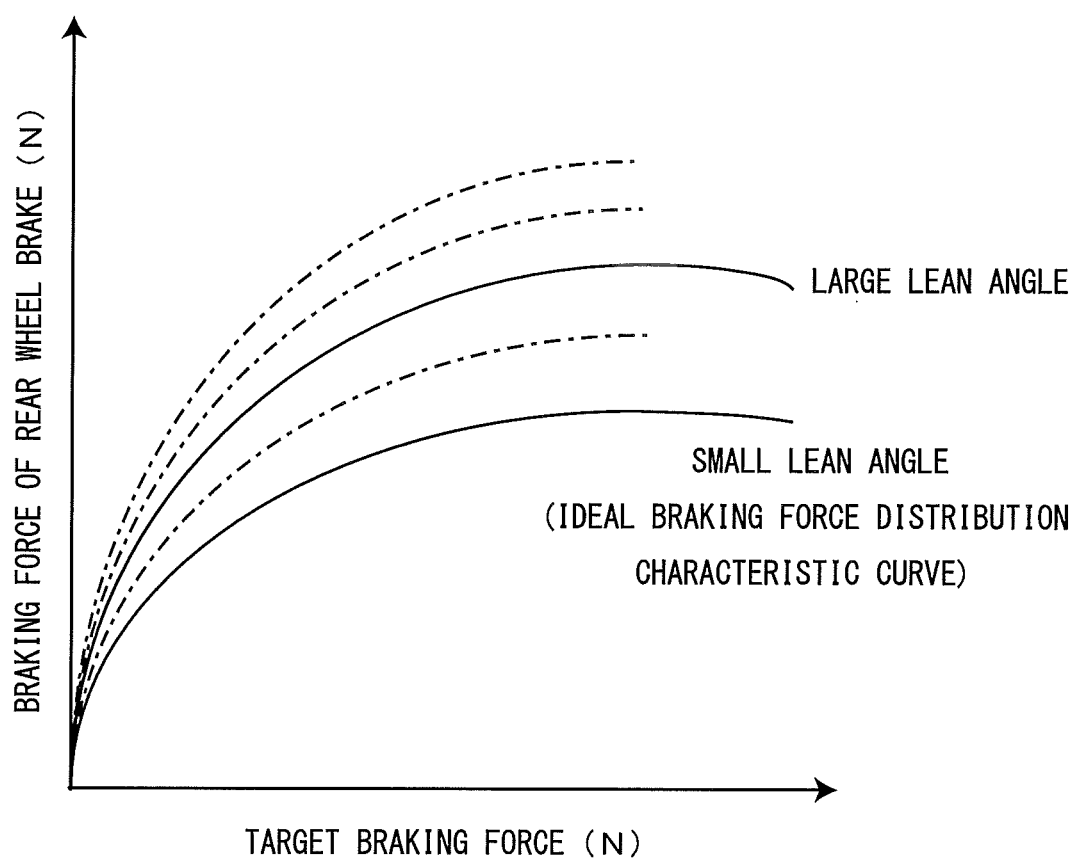
FIG. 6 is a graph showing a ratio relationship between target braking force and the braking force of a rear wheel.

FIG. 6 shows the third relationships. Note that in FIG. 6, the solid lines show only an example of the third relationship each for a small lean angle (the ideal braking force distribution characteristic curve) and a large lean angle. As indicated by the chain lines in FIG. 6, a plurality of the third relationships are stored on a lean angle basis for large lean angles. In FIG. 6, the solid lines and the chain lines represent the plurality of third relationships, but the third relationships shown in FIG. 6 are examples only and the storage portion 551 actually stores even more different third relationships on a lean angle basis.

FIG. 6 shows the two third relationships according to lean angles of the motorcycle 1 by the solid lines. The ratio of the braking force of the rear wheel brake 52 to the total target braking force is greater when the lean angle of the motorcycle 1 is large as compared to when the lean angle of the motorcycle 1 is small.

As shown in FIGS. 5 and 6, the ratio of the braking force of the front wheel brake 51 and the braking force of the rear wheel brake 52 is determined based on the ideal braking force distribution characteristic curve for small lean angles. As the lean angle increases, the ratio of the braking force of the front wheel brake 51 to the total target braking force is reduced while the ratio of the braking force of the rear wheel brake 52 to the total target braking force is raised.

When the brake lever 53 is operated by a rider, the operation amount of the brake lever 53 is detected by the stroke sensor 53*a*. The target braking force setter sets the target braking force based on the operation amount of the brake lever 53 by referring to the first relationship. The lean angle of the vehicle body is detected by the lean angle detection sensor 54. The lean angle detected by the lean angle detection sensor 54 is input to the detection result input portion 552.

The ratio setter 554 determines which second relationship among the plurality of second relationships stored in the storage portion 551 to refer to based on the lean angle of the vehicle body. The ratio setter 554 refers to the second relationship and detects a ratio of the braking force of the front wheel brake 51 to the total target braking force from the target braking force. The ratio setter 554 determines which third relationship to refer to among the plurality of third relationships stored in the storage portion 551 from the lean angle of the vehicle body. The ratio setter 554 refers to the third relationship and detects a ratio of the braking force of the rear wheel brake 52 to the total target braking force from the target braking force.

Then, the braking force calculator 555 is configured and programmed to calculate a ratio of the braking force of the front wheel brake 51 from the ratio of the braking force of the front wheel brake 51 to the total target braking force and the target braking force. The braking force calculator 555 also calculates the braking force for the rear wheel brake 52 from the ratio of the braking force of the rear wheel brake 52 to the total target braking force and the target braking force.

The ECU 55*a* transmits a signal to the hydraulic control unit 55*b* so that the front wheel brake 51 causes the braking force for the front wheel brake 51 calculated by the braking force calculator 555 to act on the front wheel 3. The hydraulic control unit 55*b* supplies brake oil to the front wheel brake 51 through the front brake hydraulic pipe 55*c*. The brake piston 512 is pressed toward the second brake pad 513*b* by the brake oil. The second brake pad 513*b* is pressed against the front disk plate 31.

The ECU 55*a* transmits a signal to the hydraulic control unit 55*b* so that the rear wheel brake 52 causes the braking force for the rear wheel brake 52 calculated by the braking force calculator 555 to act on the rear wheel 4. The hydraulic control unit 55*b* supplies brake oil to the rear wheel brake 52 through the rear brake hydraulic pipe 55*d*. The brake piston 512 is pressed toward the second brake pad 513*b* by the brake oil. The brake pad 513*b* of the rear wheel brake 52 is pressed against the rear disk plate 41.

According to the above-described preferred embodiments, the ratio of the braking force of the rear wheel brake 52 to the total target braking force increases and the ratio of the braking force of the front wheel brake 51 to the total target braking force decreases when the lean angle of the vehicle body is large as compared to when the lean angle of the vehicle body is small. Therefore, the braking force of the front wheel brake 51 is reduced as compared to the case in which the ratio of the braking force of the rear wheel brake 52 to the total target braking force and the ratio of the braking force of the front wheel brake 51 to the total target braking force are not changed depending on the lean angle.

Therefore, the brakes are activated while the vehicle body of the motorcycle 1 is inclined. When, for example, the motorcycle 1 turns as its vehicle body is greatly leaning and the brakes are activated, the vehicle body is kept from rising, so that the vehicle turns while keeping the vehicle body in the leaned state.

According to the above-described preferred embodiments, when the lean angle of the vehicle body is large, the braking force of the front wheel brake 51 is reduced to be below the ideal braking force distribution characteristic curve and the braking force of the rear wheel brake 52 is increased to be above the ideal braking force distribution characteristic curve. Therefore, the rotation of the front wheel 3 is prevented from being stopped before the rotation of the rear wheel 4 is stopped (wheel locking is prevented).

Second Preferred Embodiment

Referring to the accompanying drawings, a motorcycle including a brake device 7 according to a second preferred embodiment of the present invention will be described.

The brake device 7 according to the second preferred embodiment is different from the first preferred embodiment in the following points.

For example, when the motorcycle turns at a lower speed than a prescribed threshold, it would be difficult to maneuver the vehicle if the lean angle of the vehicle body is changed in response to activation of the front wheel brake 52. Therefore, in the brake device 7 according to the second preferred embodiment, when the vehicle speed of the motorcycle is not more than the prescribed threshold, the front wheel brake and the rear wheel brake are controlled so that the ratio of the braking force of the front wheel brake to the total target braking force is reduced and the ratio of the braking force of the rear wheel brake to the total target braking force is increased.

As described above, when the brake lever is operated while the vehicle body of the motorcycle is leaning, the vehicle body rises because of the braking force acting on the front wheel, and the lean angle is reduced. The brake device 7 according to the second preferred embodiment determines the braking force for the front wheel brake and the braking force for the rear wheel brake in consideration of the reduction in the lean angle using a correction value produced by adding a reduction in the lean angle caused by the activation of the front wheel brake to an actual lean angle of the vehicle body so that the present lean angle of the vehicle body is maintained even if the front wheel brake is activated.

The motorcycle according to the second preferred embodiment is preferably the same as the first preferred embodiment except for the structure of the brake device 7. Therefore, the elements other than the brake device 7 will not be described. The elements having the same structures as those according to the first preferred embodiment are designated by the same reference characters as those of the first preferred embodiment and their description will not be provided.

Figure 7:
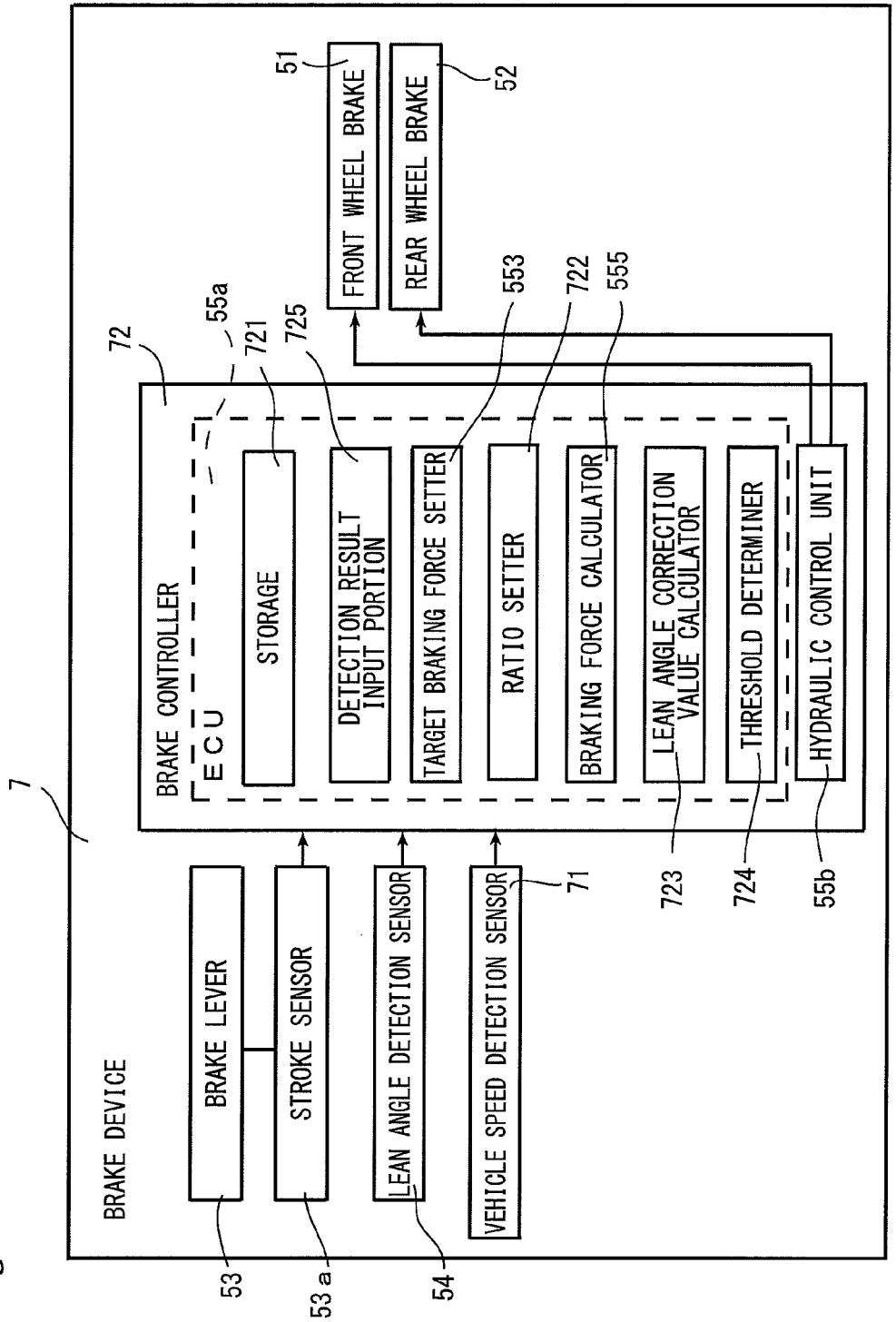
FIG. 7 is a general block diagram of a brake device according to another preferred embodiment of the present invention.

FIG. 7 is a general block diagram of a structure of the brake device 7.

The brake device 7 includes a brake lever 53, a stroke sensor 53*a*, a lean angle detection sensor 54, a vehicle speed detection sensor 71, a front wheel brake 51, a rear wheel brake 52, and a brake controller 72. The structure other than vehicle speed detection sensor 71 and the brake controller 72 is preferably the same as that of the brake device 5 according to the first preferred embodiment and therefore only the vehicle speed sensor 71 and the brake controller 72 will be described in detail.

The vehicle speed detection sensor 71 detects the vehicle speed of the motorcycle 1. The vehicle speed detection sensor 71 includes a sensor configured to detect the rotation speed of a wheel. The vehicle speed detection sensor 71 calculates a speed of the motorcycle 1 based on the rotation speed of the wheel detected by the sensor configured to detect the rotation speed of the wheel.

The brake controller 72 includes an ECU 55*a* and a hydraulic control unit 55*b*. The ECU 55*a* includes a storage portion 721, a detection result input portion 725, a target braking force setter 553, a ratio setter 722, a braking force calculator 555, a lean angle correction value calculator 723, and a threshold determiner 724. The target braking force setter 553 and the braking force calculator 555 are preferably the same as those according to the first preferred embodiment, and their structures will not be described.

The storage portion 721 stores data about fourth and fifth relationships in addition to the data about the first to third relationships according to the first preferred embodiment. The first to third relationships are the same as those according to the first preferred embodiment and therefore will not be described. The fourth relationship is a relationship that indicates a ratio of the target braking force and the braking force of the front wheel brake 51 when the vehicle speed of the motorcycle 1 is less than a threshold. The fifth relationship is a relationship that represents a ratio of target braking force and the braking force of the rear wheel brake 52 when the vehicle speed of the motorcycle 1 is less than the threshold.

The detection result input portion 725 is provided with a detection result detected by the lean angle detection sensor 54 as an input. The detection result input portion 725 is provided with data about a vehicle speed detected by the vehicle speed detection sensor 71 as an input.

The lean angle correction value calculator 723 is configured and programmed to calculate a lean angle that is reduced in response to activation of the front wheel brake 51 and to calculate a correction value according to the reduction in the lean angle. The storage portion 721 stores a table indicating the relationship between the braking force of the front wheel brake 51 and the reduction in the lean angle. The lean angle correction value calculator 723 refers to the table to calculate the reduction in the lean angle from the braking force of the front wheel brake 51. The lean angle correction value calculator 723 adds the reduction in the lean angle in advance to an angle detected by the lean angle detection sensor 54 to produce a lean angle correction value.

The threshold determiner 724 is configured and programmed to determine whether the vehicle speed of the motorcycle 1 detected by the vehicle speed detection sensor 71 is more than a prescribed threshold. Here, the prescribed threshold preferably is set to about from about 6 kilometers per hour to about 10 kilometers per hour, for example.

The ratio setter 722 sets a ratio of the braking force of the front wheel brake 51 and the braking force of the rear wheel brake 52. The ratio setter 722 sets a ratio of the braking force of the front wheel brake 51 to the total target braking force and a ratio of the braking force of the rear wheel brake 52 to the total target braking force based on the fourth and fifth relationships when the vehicle speed of the motorcycle 1 is equal to or less than the prescribed threshold. The ratio setter 722 sets a ratio of the braking force of the front wheel brake 51 and the braking force of the rear wheel brake 52 based on the lean angle correction value and the second and third relationships when the vehicle speed of the motorcycle 1 is more than the prescribed threshold.

Figure 8:
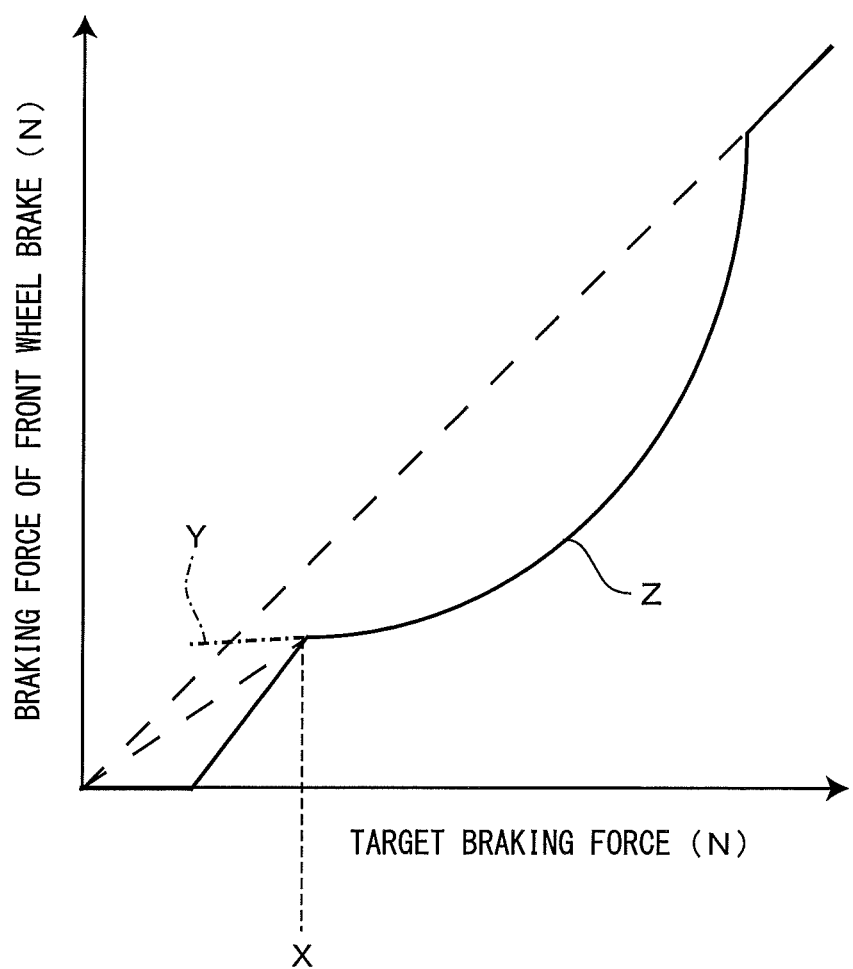
FIG. 8 is a graph showing a ratio relationship between target braking force and the braking force of the front wheel at low speed.

FIG. 8 shows the fourth relationship. When the vehicle speed of the motorcycle 1 is less than the threshold, the braking force for the front wheel brake 51 is set based on the fourth relationship. In the range in which the target braking force is less than a prescribed value X, the braking force of the front wheel brake 51 is smaller than the line Y extended from the braking force distribution characteristic curve Z.

Figure 9:
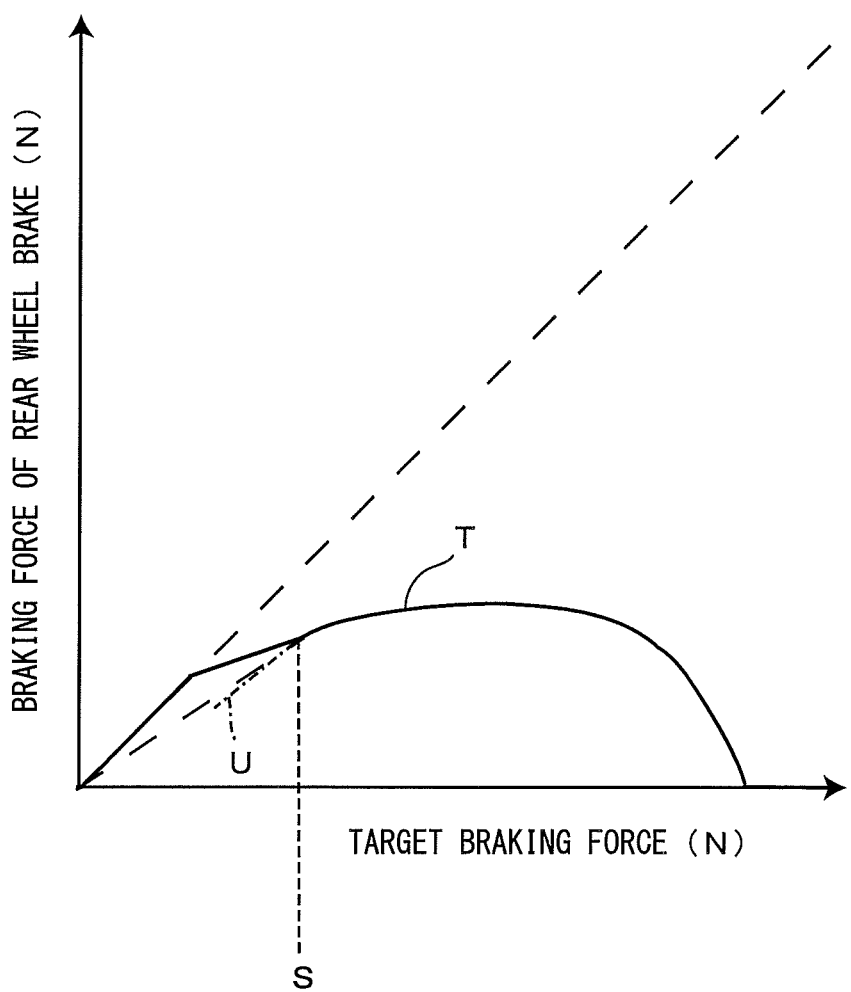
FIG. 9 is a graph showing a ratio relationship between target braking force and the braking force of the rear wheel at low speed.

FIG. 9 shows the fifth relationship. When the vehicle speed of the motorcycle 1 is less than the threshold, the braking force for the rear wheel brake 52 is set based on the fifth relationship. In the range in which the target braking force is less than a prescribed value S, the braking force of the rear wheel brake 52 is larger than the line U extended from the braking force distribution characteristic curve T.

Figure 10:
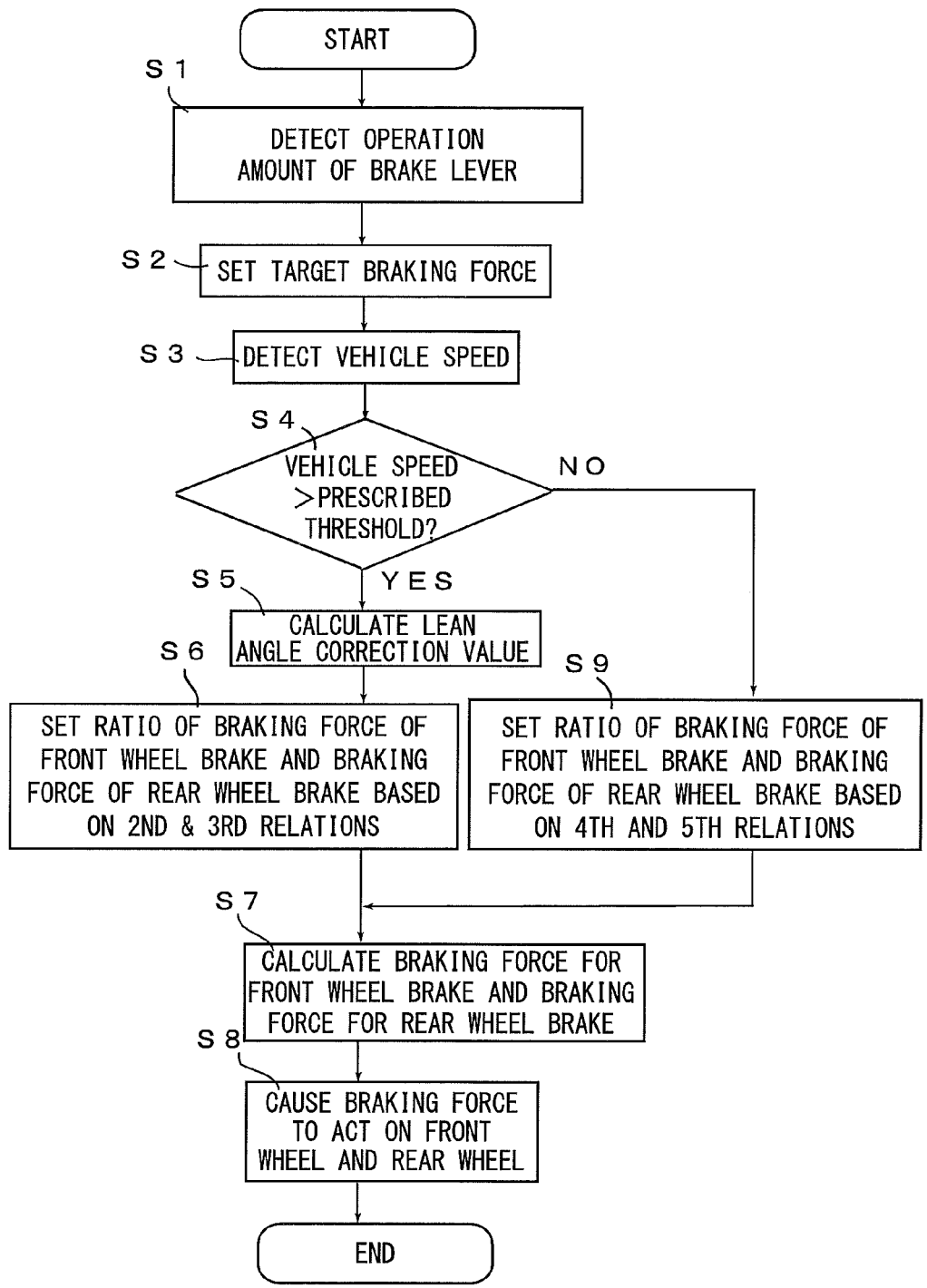
FIG. 10 is a flow chart for illustrating the operation of a brake device according to a second preferred embodiment of the present invention.
Figure 11:
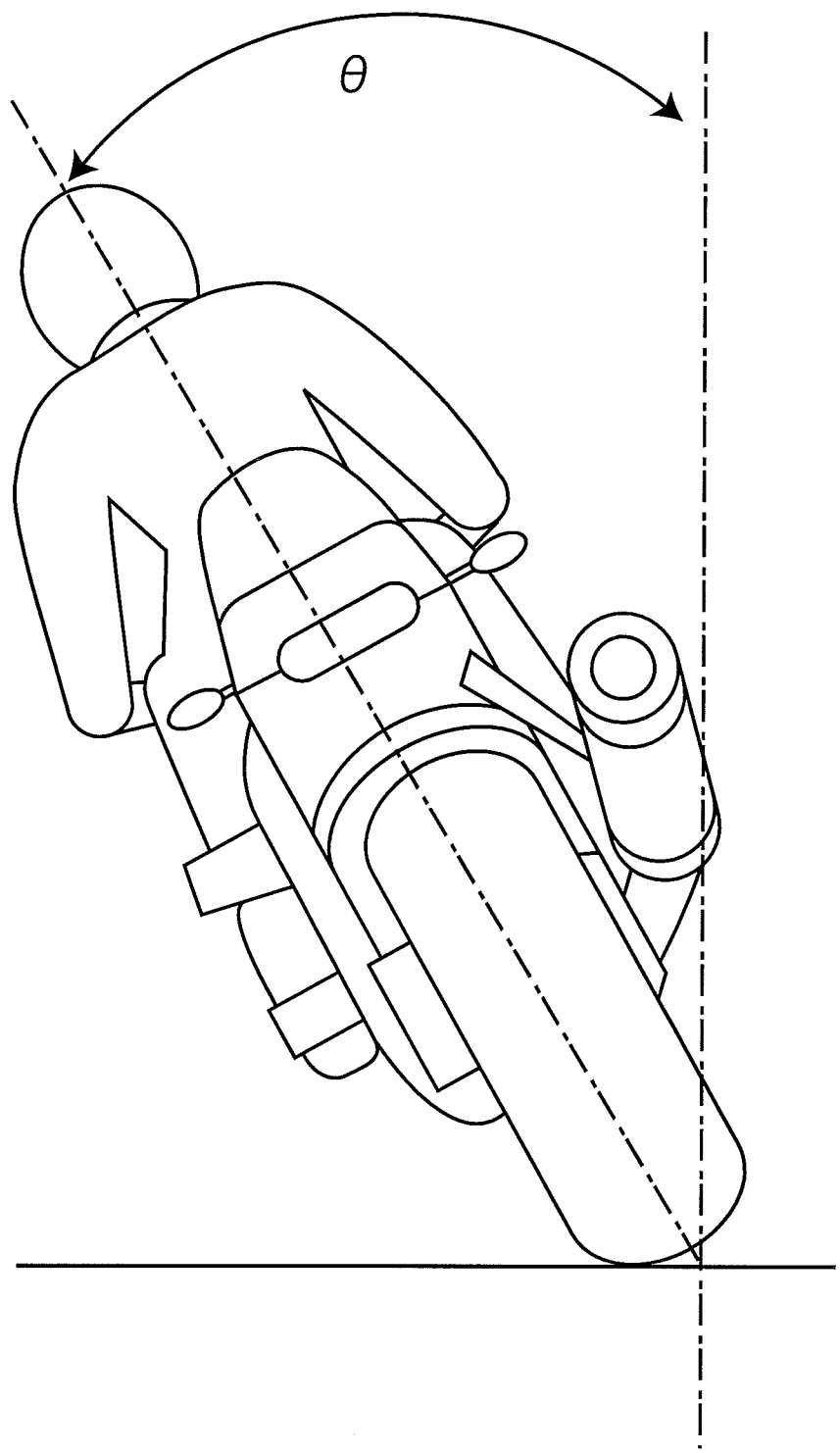
FIG. 11 is a rear view of a motorcycle and a rider when the vehicle body is leaning at a prescribed lean angle.

FIG. 10 is a flow chart for illustrating the brake device 7.

When the brake lever 53 is operated, the operation amount of the brake lever 53 is detected by the stroke sensor 53*a* (step S1). The target braking force setter 553 detects target braking force from the operation amount of the brake lever 53 by referring to the first relationship (step S2). The vehicle speed detection sensor 71 detects the vehicle speed of the motorcycle 1 (step S3). The threshold determiner 724 determines whether the vehicle speed of the motorcycle 1 is more than the prescribed threshold (step S4).

If the vehicle speed of the motorcycle 1 is more than the prescribed threshold (YES in step S4), the lean angle correction value calculator 723 calculates a lean angle correction value by the procedure described above from the operation amount of the brake lever 53 (step S5).

The ratio setter 554 is configured and programmed to determine which second relationship to refer to among the plurality of second relationships stored in the storage portion 551 based on the lean angle correction value. Referring to the second relationship, the target braking force setter 553 detects the ratio of the braking force of the front wheel brake 51 to the total target braking force based on the target braking force. Here, the lean angle correction vale is used as a lean angle in the second relationship. The ratio setter 554 determines which third relationship to refer to among the plurality of third relationships stored in the storage portion 551 based on the lean angle correction value. The ratio setter 554 sets a ratio of the braking force of the rear wheel brake 52 to the total target braking force based on target braking force by referring to the third relationship (step S6).

The braking force calculator 555 calculates the braking force for the front wheel brake 51 based on the ratio of the target braking force and the braking force of the front wheel brake 51. The braking force calculator 555 calculates the braking force for the rear wheel brake 52 based on the ratio of the target braking force and the braking force of the rear wheel brake 52 (step S7).

The ECU 55*a* transmits a signal to the hydraulic control unit 55*b* so that the front wheel brake 51 causes the braking force calculated by the braking force calculator 555 for the front wheel brake 51 to act on the front wheel 3. The hydraulic control unit 55*b* supplies brake oil to the front wheel brake 51 through the front brake hydraulic pipe 55*c*. The brake piston 512 is pressed toward the second brake pad 513*b* by the brake oil. The second brake pad 513*b* is pressed against the front disk plate 31.

The ECU 55*a* transmits a signal to the hydraulic control unit 55*b* so that the rear wheel brake 52 causes the braking force calculated by the braking force calculator 555 for the rear wheel brake 52 to act on the rear wheel 4. The hydraulic control unit 55*b* supplies brake oil to the rear wheel brake 52 through the rear brake hydraulic pipe 55*d*. The brake piston 512 is pressed toward the second brake pad 513*b* by the brake oil. The brake pad 513 of the rear wheel brake 52 is pressed against the rear disk plate 41 (step S8).

If the vehicle speed of the motorcycle 1 is equal to or less than the prescribed threshold (NO in step S4), the ratio setter 554 sets a ratio of the braking force of the front wheel brake 51 to the total target braking force based on the target braking force by referring to the fourth relationship. The ratio setter 554 sets a ratio of the braking force of the rear wheel brake 52 to the total target braking force based on the target braking force by referring to the fifth relationship (step S9).

The braking force calculator 555 calculates the braking force for the front wheel brake 51 from the ratio of the braking force of the front wheel brake 51 to the total target braking force. The braking force calculator 555 calculates the braking force for the rear wheel brake 52 based on the ratio of the braking force of the rear wheel brake 52 to the total target braking force (step S7).

The ECU 55*a* transmits a signal to the hydraulic control unit 55*b* so that the front wheel brake 51 causes the braking force calculated by the braking force calculator 555 for the front wheel brake 51 to act on the front wheel 3. The hydraulic control unit 55*b* supplies brake oil to the front wheel brake 51 through the front brake hydraulic pipe 55*c*. The brake piston 512 is pressed toward the second brake pad 513*b* by the brake oil. The second brake pad 513*b* is pressed against the front disk plate 31. The ECU 55*a* transmits a signal to the hydraulic control unit 55*b* so that the rear wheel brake 52 causes the braking force calculated by the braking force calculator 555 for the rear wheel brake 52 to act on the rear wheel 4. The hydraulic control unit 55*b* supplies brake oil to the rear wheel brake 52 through the rear brake hydraulic pipe 55*d*. The brake piston 512 is pressed toward the second brake pad 513*b* by the brake oil. The brake pad 513 of the rear wheel brake 52 is pressed against the rear disk plate 41 (step S8).

Now, features of the second preferred embodiment will be described. The second preferred embodiment includes the following features in addition to the features of the first preferred embodiment.

According to the second preferred embodiment, if the vehicle speed is equal to or less than a prescribed threshold, the braking force is set for the front wheel brake 51 and the rear wheel brake 52 based on the fourth and fifth relationships. Therefore, the motorcycle according to the second preferred embodiment turns more easily at a lower vehicle speed while the vehicle body is leaning.

According to the second preferred embodiment, a reduction in the lean angle in response to activation of the front wheel brake 51 is taken into account. Therefore, the motorcycle according to the second preferred embodiment turns more easily as the lean angle of the vehicle body is maintained than the motorcycle 1 according to the first preferred embodiment.

Other Preferred Embodiments

The motorcycles 1 according to various preferred embodiments have been described, but the present invention is not limited to the above. Preferred embodiments of the present invention are also applicable to a three- or four-wheeled saddle riding type vehicle, for example.

The examples according to the first and second preferred embodiments preferably using both the second and third relationships have been described, but the present invention is not limited to the above. The braking force for the front wheel brake and the rear wheel brake may be calculated as in the following two examples.

Firstly, unlike the first and second preferred embodiments, the storage portion preferably does not store any of third relationships. The ratio setter sets a ratio of the braking force of the front wheel brake to the total target braking force from the second relationship based on the lean angle of the motorcycle. The braking force calculator calculates the braking force for the front wheel brake from the ratio of the braking force of the front wheel brake to the total target braking force. The braking force calculator calculates the braking force for the rear wheel brake by subtracting the braking force of the front wheel brake from the target braking force.

Secondly, unlike the first and second preferred embodiments, the storage portion preferably does not store any of second relationships. The ratio setter sets a ratio of the braking force of the rear wheel brake to the total target braking force from the target braking force and the third relationship based on the lean angle of the vehicle body. The braking force calculator calculates the braking force for the rear wheel brake from the ratio of the braking force of the rear wheel brake to the total target braking force. The braking force calculator calculates the braking force for the front wheel brake by subtracting the braking force of the rear wheel brake from the target braking force.

According to the description of the second preferred embodiment, both the fourth and fifth relationships are preferably used but the present invention is not limited to the above. Braking force for the front wheel brake and the rear wheel brake may be calculated as in the following two examples.

Firstly, unlike the second preferred embodiment described above, the storage portion preferably does not store the fifth relationship. The ratio setter sets a ratio of the braking force of the front wheel brake to the total target braking force from the target braking force and the fourth relationship. The braking force calculator calculates the braking force for the front wheel brake from the ratio of the braking force of the front wheel brake to the total target braking force. The braking force calculator calculates the braking force for the rear wheel brake by subtracting the braking force of the front wheel brake from the target braking force.

Secondly, unlike the second preferred embodiment described above, the storage portion preferably does not store the fourth relationship. The ratio setter sets a ratio of the braking force of the rear wheel brake to the total target braking force from the target braking force and the fifth relationship. The braking force calculator calculates the braking force for the rear wheel brake from the ratio of the braking force of the rear wheel brake to the total target braking force. The braking force calculator calculates the braking force for the front wheel brake by subtracting the braking force of the rear wheel brake from the target braking force.

The motorcycle 1 according to the first preferred embodiment described above preferably uses the lean angle detected by the lean angle detection sensor 54 instead of the lean angle correction value according to the second preferred embodiment when the braking force is calculated for the front wheel brake 51 and the rear wheel brake 52. However, the lean angle correction value may be used according to the first preferred embodiment similarly to the second preferred embodiment. In this case, change in the lean angle is reduced upon activating the brakes similarly to the second preferred embodiment, which further improves the operability.

The motorcycle 1 according to the first preferred embodiment does not take into account the vehicle speed in order to calculate the braking force for the front wheel brake 51 and the rear wheel brake 52. But similarly to the second preferred embodiment, the vehicle speed detection sensor 71 may be provided in the arrangement according to the first preferred embodiment, so that the second and third relationships and the fourth and fifth relationships may be used separately depending on whether the vehicle speed is equal to or less than a threshold.

The brake disk type brake device has been described in conjunction with the first and second preferred embodiments but the present invention is not limited to the above. The brake device may be a drum brake type device.

According to the first and second preferred embodiments of the present invention, the gyro sensor is preferably used in order to detect the lean angle of the vehicle body but the present invention is not limited to the above. Any other sensor or method may be used to detect the lean angle of the vehicle body. For example, the lean angle of the vehicle body may be calculated from a detection result from a yaw rate sensor and a detection result from a vehicle speed sensor or based on GPS data.

According to the first and second preferred embodiments, a wheel speed detection sensor attached to a wheel is preferably used in order to detect a vehicle speed but the present invention is not limited to the above. Any other sensor or method may be employed to detect the vehicle speed. The vehicle speed may be detected for example from GPS data. The speed may be calculated by integrating acceleration of the motorcycle using an acceleration sensor. In this case, the vehicle speed may be detected even when the wheels are locked or when the rotation of the wheels is stopped.

According to the first and second preferred embodiments, the brake lever 53 is used as an example of a brake operator but the present invention is not limited to the above. Any other arrangement such as a foot pedal may be used.

The brake device according to the first preferred embodiment preferably allows only the second brake pad 513b to be pressed against the side of the front disk plate 31 as the front wheel brake 51 and the rear wheel brake 52, but the present invention is not limited to the above. The brake device may allow both the first brake pad 513a and the second brake pad 513b to be pressed toward the front disk plate 31.

According to the above-described preferred embodiments, the stroke sensor 53a preferably is configured as a sensor to detect the operation amount of the brake lever 53, but the present is not limited to the above. Any other sensor or method may be used to detect the operation amount of the brake lever 53. A rotary potentiometer as well as a linear potentiometer may be used as the stroke sensor. Furthermore, a load cell may be used instead of the stroke sensor and an operation amount is detected from a load acting on the brake lever.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A brake device provided in a saddle riding type vehicle, the brake device comprising:
   a front wheel brake configured to cause a braking force to act on a front wheel;
   a rear wheel brake configured to cause a braking force to act on a rear wheel;
   a brake operation unit configured to operate both the front wheel brake and the rear wheel brake using one operator;
   a lean angle detection sensor configured to detect a lean angle of a vehicle body of the saddle riding type vehicle;
   a detection result input portion configured to be provided with a detection result from the lean angle detection sensor as an input;
   a storage portion configured to store a first relationship that represents a relationship between an operation amount of the brake operation unit and a target braking force, and a second relationship that represents a ratio of the braking force of the front wheel brake to the target braking force determined for each lean angle and/or a third relationship that represents a ratio of the braking force of the rear wheel brake to the target braking force determined for each lean angle;
   a target braking force setter configured to set the target braking force based on the operation amount of the braking operation unit by referring to the first relationship;
   a ratio setter configured and programmed to determine which second relationship to refer to among the second relationships stored in the storage portion from the detection result input to the detection result input portion and/or to determine which third relationship to refer to among the third relationships stored in the storage portion from the detection result input to the detection result input portion, and to set a ratio of the braking force of the front wheel brake and the braking force of the rear wheel brake based on the second relationship and/or the third relationship; and
   a braking force calculator configured and programmed to calculate the braking force for the front wheel brake and the braking force for the rear wheel brake based on the target braking force set by the target braking force setter and the ratio set by the ratio setter.

2. The brake device according to claim 1, wherein, in the second relationship, the ratio of the braking force of the front wheel brake to the target braking force decreases as the lean angle of the vehicle body increases; and
   in the third relationship, the ratio of the braking force of the rear wheel brake to the target braking force increases as the lean angle of the vehicle body increases.

3. The brake device according to claim 1, further comprising:
   a lean angle correction value calculator configured and programmed to calculate a lean angle correction value from the detection result input to the detection result input portion; wherein
   the lean angle correction value calculator is configured and programmed to calculate the lean angle correction value by adding an expected reduction in the lean angle caused by operating the brake operation unit to the detection result;
   the ratio setter is configured and programmed to set a ratio of the braking force of the front wheel brake and the braking force of the rear wheel brake based on the lean angle correction value and the second relationship and/or the third relationship.

4. The brake device according to claim 1, wherein a curve related to a ratio of the braking force of the front wheel brake and the braking force of the rear wheel brake when the front and rear wheels stop rotating and are locked at the same time is an ideal braking force distribution characteristic curve; and
   the ratio setter is configured and programmed to reduce the ratio of the braking force of the front wheel brake and to increase the ratio of the braking force of the rear wheel brake with respect to the ideal braking force distribution characteristic curve.

5. The brake device according to claim 1, further comprising:
   a speed detector configured to detect a speed of the saddle riding type vehicle; and
   a threshold determiner configured and programmed to determine whether the speed of the saddle riding type vehicle is equal to or less than a prescribed threshold; wherein
   the detection result input portion is provided with data about the speed detected by the speed detector as an input; and
   the ratio setter is configured and programmed to increase the ratio of the braking force of the rear wheel brake to the target braking force when the threshold determiner determines that the speed of the saddle riding type vehicle is equal to or less than the prescribed threshold as compared to when the threshold determiner determines that the speed of the saddle riding type vehicle is more than the prescribed threshold.

6. The brake device according to claim 1, wherein the lean angle detection sensor includes a gyro sensor and is configured and programmed to calculate a lean angle of the vehicle body based on a value detected by the gyro sensor.

7. The brake device according to claim 1, wherein the speed detector includes an acceleration sensor configured to detect an acceleration of the saddle riding type vehicle and to calculate a speed based on a detection result from the acceleration sensor.

8. A saddle riding type vehicle comprising the brake device according to claim 1.

* * * * *